No. 623,512. Patented Apr. 25, 1899.
S. C. BRINSER.
CORN ROASTER.
(Application filed Dec. 8, 1898.)
(No Model.) 2 Sheets—Sheet 1.

Witnesses
Harold H. Simms
H. W. Riley

Solomon C. Brinser, Inventor.
By his Attorneys,
C. A. Snow & Co.

No. 623,512. Patented Apr. 25, 1899.
S. C. BRINSER.
CORN ROASTER.
(Application filed Dec. 8, 1898.)
(No Model.) 2 Sheets—Sheet 2.

Witnesses
Harold H. Simms
By his Attorneys,
Solomon C. Brinser Inventor
C. A. Snow & Co.

UNITED STATES PATENT OFFICE.

SOLOMON C. BRINSER, OF MIDDLETOWN, PENNSYLVANIA.

CORN-ROASTER.

SPECIFICATION forming part of Letters Patent No. 623,512, dated April 25, 1899.

Application filed December 8, 1898. Serial No. 698,659. (No model.)

*To all whom it may concern:*

Be it known that I, SOLOMON C. BRINSER, a citizen of the United States, residing at Middletown, in the county of Dauphin and State of Pennsylvania, have invented a new and useful Corn-Roaster, of which the following is a specification.

The invention relates to improvements in corn-roasters.

The object of the present invention is to improve the construction of apparatus for cooking grain and to provide a simple and comparatively inexpensive corn-roaster adapted for cooking green and dry corn for meal and capable of agitating and rotating the corn to prevent the same from burning and also to remove the outer skin or hull.

The invention consists in the construction and novel combination and arrangement of parts hereinafter fully described, illustrated in the accompanying drawings, and pointed out in the claims hereto appended.

Figure 1:
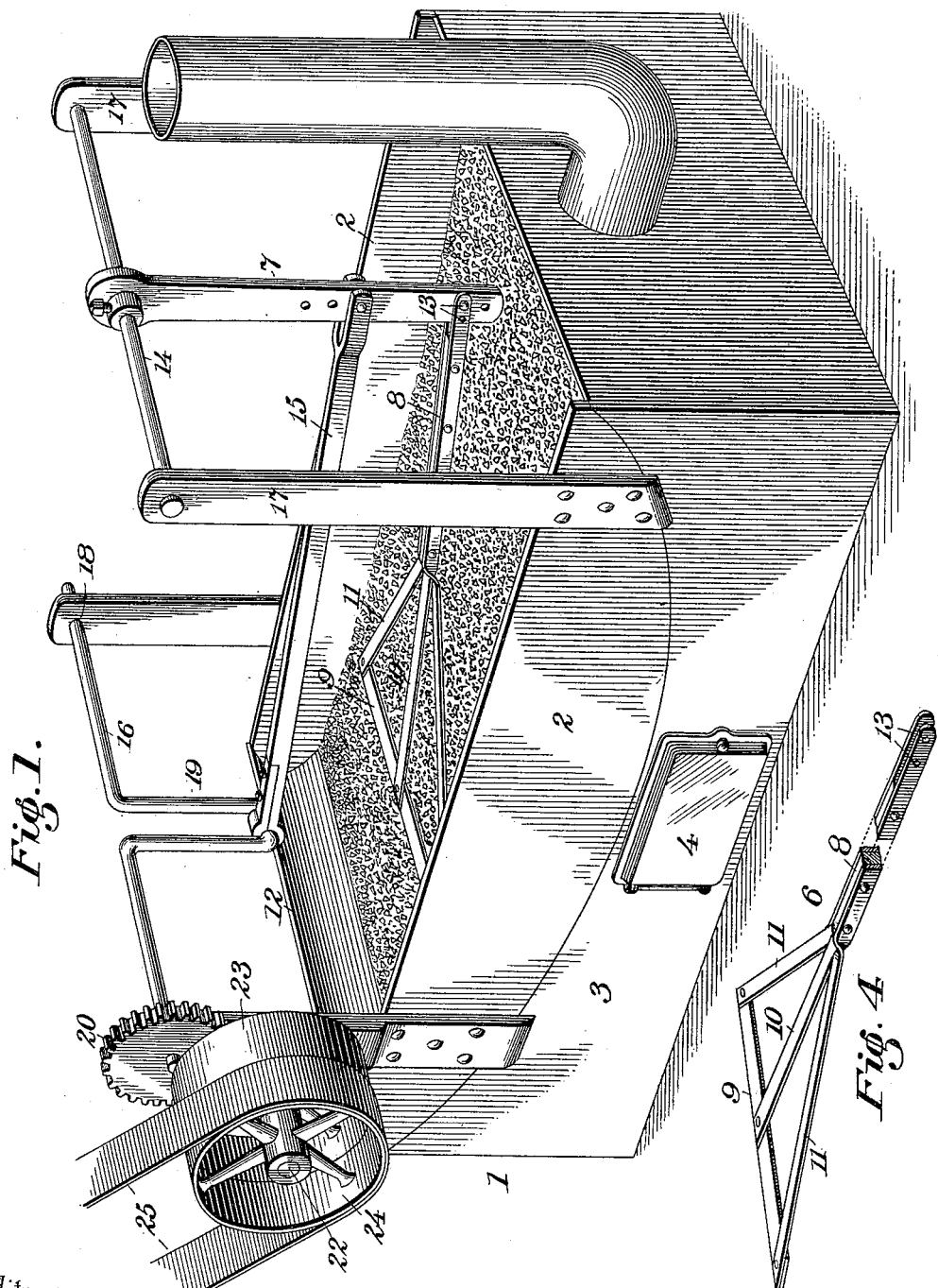
Figure 2:
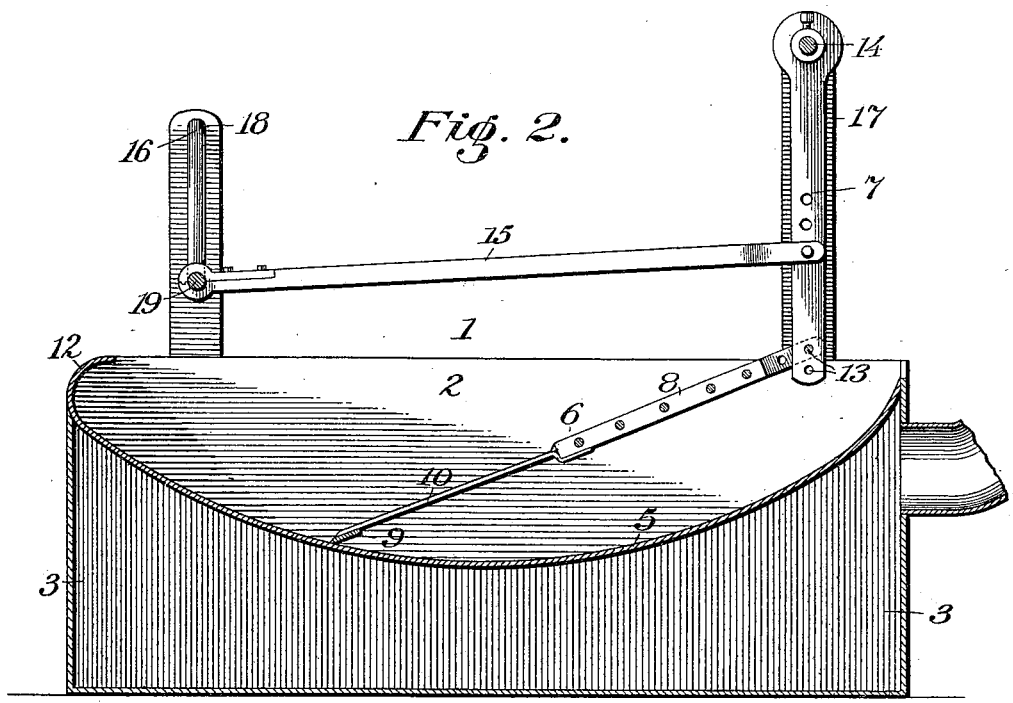
Figure 3:
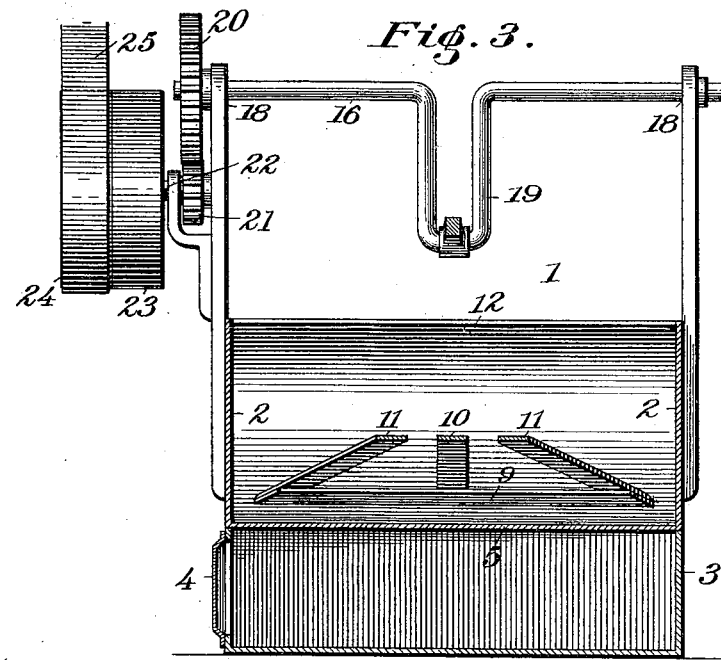

In the drawings, Figure 1 is a perspective view of a corn-roaster constructed in accordance with this invention. Fig. 2 is a longitudinal sectional view. Fig. 3 is a transverse sectional view. Fig. 4 is a detail perspective view of the reciprocating agitator.

Like numerals of reference designate corresponding parts in all the figures of the drawings.

1 designates an open kiln consisting of a pan 2 and a suitable heating apparatus arranged beneath the pan, and this apparatus may consist of a casing 3, provided with a suitable door 4 and adapted to form a furnace, a suitable smoke-pipe being provided for the escape of the products of combustion. The pan is provided with a curved bottom 5, and is preferably constructed of sheet metal, as shown, and the corn which is placed loosely upon the bottom of the pan is agitated and rotated by means of a reciprocating agitator 6, adapted to insure a uniform cooking of the grain and to prevent the same from burning. It also serves to remove the outer skin or hull from the corn as it passes through and over the same.

The reciprocating agitator, which is connected with an oscillating arm 7, consists of a stem 8, a transverse head 9, and diverging arms 10 and 11, connecting the stem and the head. The head and the arms 10 and 11 are preferably constructed of flat metal, as shown. The arm 10, which is located at the center of the head, forms a continuation of the stem, and the arms 11 are located at opposite sides of the central arm 10, as clearly shown in Fig. 4 of the accompanying drawings.

The agitator is arranged at an inclination, and as it moves forward it runs along the curved bottom of the pan, passing beneath the corn and agitating the latter, and when it moves backward it passes over the top of the corn and levels the same. The pan is provided at one end with a curved extension 12, which is substantially semicylindrical in cross-section and which is adapted to cause the corn to fall backward when the same is carried against it by the agitator. The curved extension or deflector and the agitator cause the corn to be thoroughly agitated and mixed, so that the grain will be thoroughly and uniformly cooked without burning.

The stem is provided with a bifurcation at its outer end, which is adjustably pivoted to the lower end of the arm 7 by means of a pivot and a series of perforations 13. The arm 7 depends from a transverse shaft 14 and is oscillated by a connecting-rod or pitman 15, extending from the stem to a crank-shaft 16. The shaft 14 is supported by suitable uprights or standards 17, and the crank-shaft, which is journaled in suitable bearings 18, has a centrally-arranged crank 19 and is driven by any suitable power. One end of the crank-shaft carries a gear-wheel 20, which meshes with a pinion 21 of a counter-shaft 22, and the latter carries a fast pulley 23 and a loose pulley 24, adapted to receive a belt 25, which is moved from one pulley to the other by a suitable shifting device.

The invention has the following advantages: The corn-roaster, which is simple and comparatively inexpensive in construction, is positive and reliable in operation and is adapted to agitate and rotate the corn thoroughly, so as to insure a uniform cooking and at the same time to prevent burning. When the agitator moves forward, it passes beneath the corn, along the bottom of the pan, freeing the grain from the same, and it moves backward over the top of the corn, leveling the same. The head and the arms 10 and 11 serve to remove the outer skin or hull from the corn, and the curved deflector at one end of the pan coöperates with the agitator in rotating the corn and bringing different portions of the same to the bottom of the pan. The outer end of the stem of the agitator is adjustably connected to the depending arm of the transverse shaft 14 and is adapted to be raised and lowered to set the head of the agitator at the proper inclination, so that it will operate properly on the corn.

Changes in the form, proportion, and minor details of construction may be resorted to without departing from the spirit or sacrificing any of the advantages of this invention.

What is claimed is—

1. A device for cooking grain comprising a cooking-receptacle, a heating apparatus located beneath the receptacle a reciprocating agitator arranged to move forward beneath the grain to prevent the same from burning, and adapted to pass backward over the same to level the grain and distribute it evenly to insure a uniform cooking, and means for operating the agitator, substantially as described.

2. A device for cooking grain comprising a cooking-receptacle, a heating apparatus located beneath the receptacle and an agitator arranged to pass beneath the grain to free the same from the bottom of the receptacle to prevent burning, and arranged to pass over the grain to distribute the same evenly over the receptacle after it has been agitated, substantially as described.

3. A device for cooking grain comprising a cooking-receptacle, a heating apparatus a deflector arranged at one end of the same and adapted to throw the grain backward and turn it over, and a reciprocating agitator operating in the cooking-receptacle and adapted to carry the grain to and from the deflector, substantially as described.

4. A device for cooking grain, comprising a pan having a curved bottom extended upward at one end and forming a curved deflector, a heating apparatus arranged beneath the pan and a reciprocating agitator arranged within the pan, substantially as described.

5. A device for cooking grain comprising a cooking-receptacle, a heating apparatus arranged beneath the receptacle a transverse shaft provided with a depending arm, an inclined reciprocating agitator connected with the depending arm and adapted to rest upon the bottom of the receptacle, a crank-shaft, and a bar or pitman connecting the crank of the crank-shaft with the arm of the transverse shaft, substantially as described.

6. A device for cooking grain comprising a cooking-receptacle, a heating apparatus and a reciprocating agitator adapted to pass over and beneath the grain and provided with a head composed of a transverse bar and diverging arms, said bar and arms being adapted to remove the skin or hulls from the corn, substantially as described.

In testimony that I claim the foregoing as my own I have hereto affixed my signature in the presence of two witnesses.

SOLOMON C. BRINSER.

Witnesses:
ROBERT P. RAYMOND,
I. CLASTER.